US009197836B2

(12) United States Patent
Sloo

(10) Patent No.: US 9,197,836 B2
(45) Date of Patent: Nov. 24, 2015

(54) CONTENT PROMOTION TO ANONYMOUS CLIENTS

(75) Inventor: David H. Sloo, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1266 days.

(21) Appl. No.: 12/244,750

(22) Filed: Oct. 2, 2008

(65) Prior Publication Data

US 2010/0088715 A1    Apr. 8, 2010

(51) Int. Cl.
| H04N 5/445 | (2011.01) |
| G06Q 10/06 | (2012.01) |
| G06Q 30/02 | (2012.01) |
| H04N 7/173 | (2011.01) |
| H04N 21/258 | (2011.01) |
| H04N 21/2668 | (2011.01) |
| H04N 21/442 | (2011.01) |
| H04N 21/45 | (2011.01) |
| H04N 21/466 | (2011.01) |
| H04N 21/658 | (2011.01) |

(Continued)

(52) U.S. Cl.
CPC ..... *H04N 5/44543* (2013.01); *G06Q 10/06393* (2013.01); *G06Q 30/02* (2013.01); *G06Q 30/0269* (2013.01); *H04N 7/17318* (2013.01); *H04N 21/25891* (2013.01); *H04N 21/2668* (2013.01); *H04N 21/44222* (2013.01); *H04N 21/4532* (2013.01); *H04N 21/4668* (2013.01); *H04N 21/6582* (2013.01); *H04N 21/812* (2013.01); *H04N 21/8352* (2013.01)

(58) Field of Classification Search
USPC ............................................. 725/21, 34, 35
See application file for complete search history.

(56) References Cited

U.S. PATENT DOCUMENTS

| 5,140,634 A | 8/1992 | Guillou et al. |
| 6,182,050 B1 * | 1/2001 | Ballard ..................... 705/14.61 |
| 7,222,362 B1 | 5/2007 | Canetti |

(Continued)

FOREIGN PATENT DOCUMENTS

WO    WO2008053471    5/2008

OTHER PUBLICATIONS

"Non-Malleable Non-Interactive Zero Knowledge and Adaptive Chosen-Ciphertext", http://ieeexplore.ieee.org/iel5/6604/17631/00814628.pdf?arnumber=814628.

(Continued)

*Primary Examiner* — John Schnurr
*Assistant Examiner* — Christine Kurien
(74) *Attorney, Agent, or Firm* — Aaron Chatterjee; Kate Drakos; Micky Minhas

(57) ABSTRACT

Techniques involving anonymous content promotion are described. In an implementation, content, which may include one or more advertisements embedded by a content provider, is promoted to clients who anonymously indicate behaviors. A client may generate behavior data matching behaviors of the client to unique codes. The client communicates the behavior data having the matched behaviors/unique codes anonymously to a network operator. A network operator collects behavior data from multiple clients. The network operator associates unique codes corresponding to a behavior to content to promote the content to clients who anonymously indicate the behavior through the unique codes in the behavior data. The network operator may output a promotion having the associated unique codes to multiple clients to enable each client to identify its own unique codes and obtain corresponding content recommendations and/or content.

20 Claims, 5 Drawing Sheets

(51) Int. Cl.
*H04N 21/81* (2011.01)
*H04N 21/8352* (2011.01)

(56) References Cited

U.S. PATENT DOCUMENTS

| | | | |
|---|---|---|---|
| 2004/0030932 A1 | 2/2004 | Juels | |
| 2005/0021397 A1 | 1/2005 | Cui | |
| 2005/0204382 A1* | 9/2005 | Ellis | 725/35 |
| 2005/0278731 A1* | 12/2005 | Cameron et al. | 725/14 |
| 2006/0294223 A1 | 12/2006 | Glasgow | |
| 2007/0288503 A1 | 12/2007 | Taylor | |
| 2008/0065759 A1 | 3/2008 | Sewitz | |

OTHER PUBLICATIONS

"Mantis: A Lightweight, Server—Anonymity Preserving, Searchable P2P Network", http://www.lix.poloytechnique.fr/-tome/P2p/Papers/Systems/Mantis.pdf.

"Intergrity and Access Control in Uncrusted Content Distributions Networks", http://pdos.csail.mit.edu/papers/fu-phd-thesis.pdf.

\* cited by examiner

CONTENT PROMOTION TO ANONYMOUS CLIENTS

BACKGROUND

Advertisers and content providers may seek to target their content to people who are interested in their products. For example, a provider of comedy programs may seek to target the programs to people who frequently watch funny programs. A luxury car manufacturer may seek to target ads to people who are likely to buy a luxury car. In one traditional technique to enable such targeted distribution, advertisers and content providers may collect demographic information and track behaviors that correspond to identifiable consumers. The advertisers and content providers may use this information to send targeted messages and/or content to the identifiable consumers.

However, consumers may be uneasy about having information regarding their behaviors collected by third parties due to privacy concerns. Thus, given the option, many consumers may opt out of voluntarily providing identifiable information regarding their behaviors to third parties. Thus, it may be difficult for advertisers and content providers to obtain information regarding behaviors that they may seek to enable targeted distribution of content.

SUMMARY

Techniques involving promotion of content to anonymous clients are described. In an implementation, content, which may include one or more advertisements embedded by a content provider, is promoted to clients who anonymously indicate behaviors. A client may generate behavior data matching behaviors of the client to unique codes. The client communicates the behavior data having the matched behaviors/unique codes anonymously to a network operator. A network operator collects behavior data from multiple clients. The network operator associates unique codes corresponding to a behavior to content to promote the content to clients who anonymously indicate the behavior through the unique codes in the behavior data. The network operator may output a promotion having the associated unique codes to multiple clients to enable each client to identify its own unique codes and obtain corresponding content recommendations and/or content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
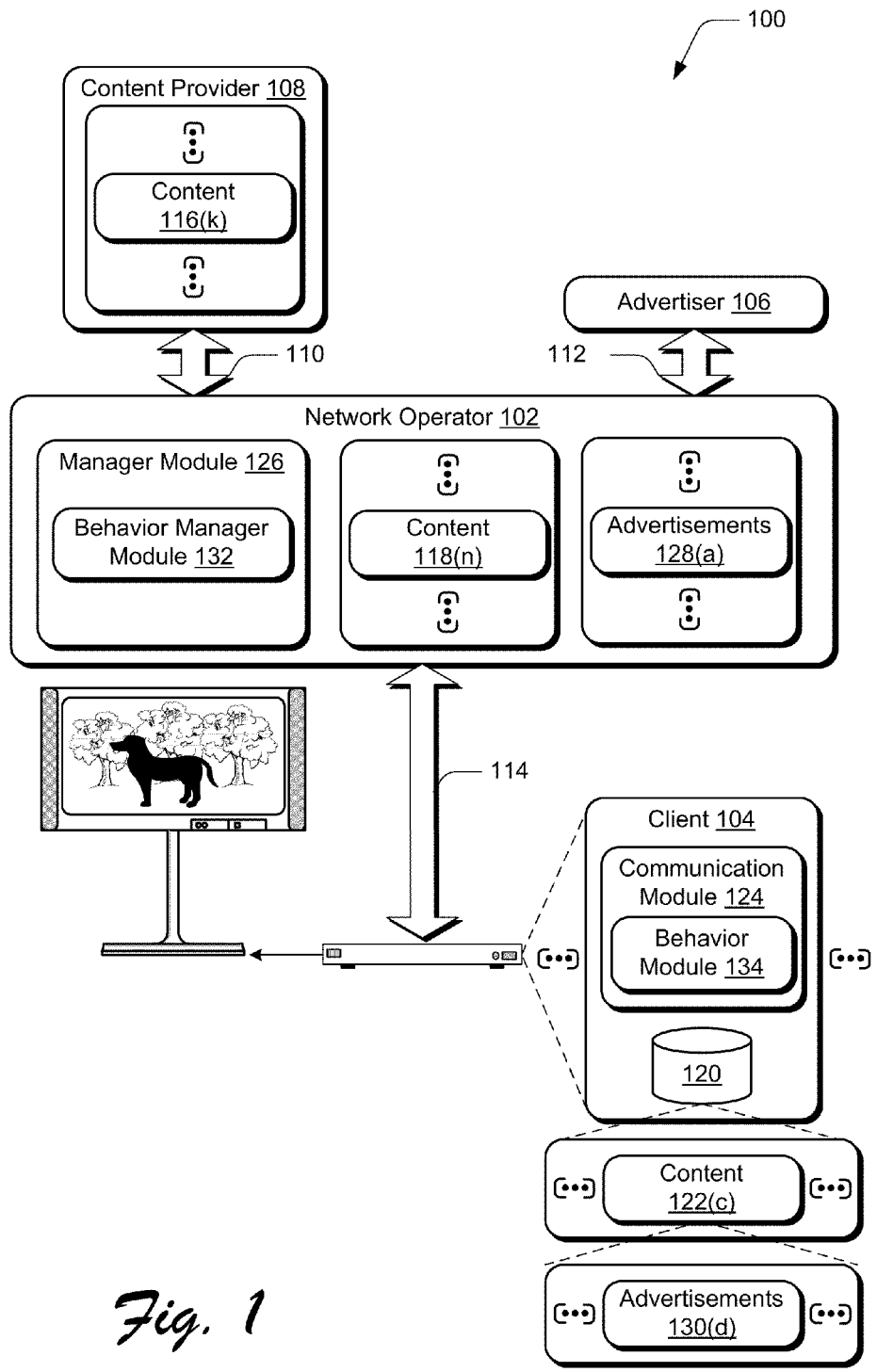
FIG. 1 is an illustration of an environment in an example implementation that is operable to employ techniques involving targeted anonymous content delivery.

Advertisers and content providers may seek to target their content to people who are interested in their products. However, due to privacy concerns, many consumers may opt out of voluntarily providing information to third parties that may be used by to identify their behaviors. Thus, it may be difficult for advertisers and content providers to obtain behavior information that may be used to enable targeted distribution of content.

Techniques involving content promotion to anonymous clients are described. In an implementation, content, which may include one or more advertisements embedded by a content provider, is promoted to clients who anonymously indicate behaviors. A client may be configured to detect various behaviors and generate behavior data to match detected behaviors to anonymous information controlled by the client. For example, a client may detect that a user of the client is watching a particular football program. The client may generate a unique code and associate the unique code with a "Football Program" behavior. The client communicates behavior data describing the "Football Program" behavior to unique code association anonymously to a network operator. The client also stores the unique code.

The network operator may receive behavior data from multiple clients matching behaviors to anonymous information (e.g., unique codes). The behavior data is insufficient for the network operator to identify the clients or understand relationships of the behaviors to the clients. The network operator may designate content to promote to a particular behavior. For example, an upcoming football game may be promoted to clients who indicate the "Football Program" behavior. To do so, the network operator may output a promotion for the upcoming football game that includes unique codes from the behavior data that are associated to the "Football Program" behavior. Because the network operator may not "know" which clients have associated unique codes with the "Football Program" behavior, the promotion may be output to multiple clients including some who indicated the "Football Program" behavior and some who did not.

A client that receives the promotion for the upcoming football game may compare its stored unique codes to those included in the promotion. When a match is found, the client "knows" the promotion was intended for them. The client may take a variety of responsive actions, such as outputting the promotion, storing the promotion, scheduling a recording of the upcoming football game, and so forth.

In the following discussion, an example environment is first described that is operable to employ techniques that involve content promotion to anonymous clients. Example procedures are then described that may be employed in the example environment, as well as in other environments. Although these techniques are described as employed within a television environment in the following discussion, it should be readily apparent that these techniques may be incorporated within a variety of environments without departing from the spirit and scope thereof.

Example Environment

FIG. 1 is an illustration of an environment 100 in an example implementation that is operable to employ techniques that involve content promotion to anonymous clients. The illustrated environment 100 includes a network operator 102 (e.g., a "head end"), one or more clients 104, an advertiser 106 and a content provider 108 that are communicatively coupled, one to another, via network connections 110, 112, 114. In the following discussion, the network operator 102, the client 104, the advertiser 106 and the content provider 108 may be representative of one or more entities, and therefore reference may be made to a single entity (e.g., the client 104) or multiple entities (e.g., the clients 104, the plurality of clients 104, and so on). Additionally, although a plurality of network connections 110-114 are shown separately, the network connections 110-114 may be representative of network connections achieved using a single network or multiple networks. For example, network connection 114 may be representative of a broadcast network with back channel communication, an Internet Protocol (IP) network, and so on.

The client 104 may be configured in a variety of ways. For example, the client 104 may be configured as a computer that is capable of communicating over the network connection 114, such as a desktop computer, a mobile station, an entertainment appliance, a set-top box communicatively coupled to a display device as illustrated, a wireless phone, and so forth. For purposes of the following discussion, the client 104 may also relate to a person and/or entity that operate the client. In other words, client 104 may describe a logical client that includes a user, software and/or a machine (e.g., a client device).

The content provider 108 includes one or more items of content 116($k$), where "k" can be any integer from 1 to "K". The content 116($k$) may include a variety of data, such as television programming, video-on-demand (VOD) files, and so on. The content 116($k$) is communicated over the network connection 110 to the network operator 102.

Content 116($k$) communicated via the network connection 110 is received by the network operator 102 and may be stored as one or more items of content 118($n$), where "n" can be any integer from "1" to "N". The content 118($n$) may be the same as or different from the content 116($k$) received from the content provider 108. The content 118($n$), for instance, may include additional data for broadcast to the client 104, such as electronic program guide (EPG) data.

The client 104, as previously stated, may be configured in a variety of ways to receive the content 118($n$) over the network connection 114. The client 104 typically includes hardware and software to transport and decrypt content 118($n$) received from the network operator 102 for rendering by the illustrated display device. Although a display device is shown, a variety of other output devices are also contemplated, such as speakers.

The client 104 may also include digital video recorder (DVR) functionality. For instance, the client 104 may include a storage device 120($n$) to record content 118($n$) as content 122($c$) (where "c" can be any integer from one to "C") received via the network connection 114 for output to and rendering by the display device. The storage device 120 may be configured in a variety of ways, such as a hard disk drive, a removable computer-readable medium (e.g., a writable digital video disc), and so on. Thus, content 122($c$) that is stored in the storage device 120 of the client 104 may be copies of the content 118($n$) that was streamed from the network operator 102. Additionally, content 122($c$) may be obtained from a variety of other sources, such as from a computer-readable medium that is accessed by the client 104, and so on.

The client 104 includes a communication module 124 that is executable on the client 104($n$) to control content playback on the client 104, such as through the use of one or more "command modes". The command modes may provide non-linear playback of the content 122($c$) (i.e., time shift the playback of the content 122($c$)) such as pause, rewind, fast forward, slow motion playback, and the like.

The network operator 102 is illustrated as including a manager module 126. The manager module 126 is representative of functionality to configure content 118($n$) for output (e.g., streaming) over the network connection 114 to the client 104. The manager module 126, for instance, may configure content 116($k$) received from the content provider 108 to be suitable for transmission over the network connection 114, such as to "packetize" the content for distribution over the Internet, configuration for a particular broadcast channel, map the content 116($k$) to particular channels, and so on.

Thus, in the environment 100 of FIG. 1, the content provider 108 may broadcast the content 116($k$) over a network connection 110 to a multiplicity of network operators, an example of which is illustrated as network operator 102. The network operator 102 may then stream the content 118($n$) over a network connection to a multitude of clients, an example of which is illustrated as client 104. The client 104 may then store the content 118($n$) in the storage device 120 as content 122($c$), such as when the client 104 is configured to include digital video recorder (DVR) functionality.

The content 118($n$) may also be representative of time-shifted content, such as video-on-demand (VOD) content that is streamed to the client 104 when requested, such as movies, sporting events, and so on. For example, the network operator 102 may execute the manager module 126 to provide a VOD system such that the content provider 108 supplies content 116($k$) in the form of complete content files to the network operator 102. The network operator 102 may then store the content 116($k$) as content 118($n$). The client 104 may then request playback of desired content 118($n$) by contacting the network operator 102 (e.g., a VOD server) and requesting a feed (e.g., stream) of the desired content.

In another example, the content 118($n$) may further be representative of content (e.g., content 116($k$)) that was recorded by the network operator 102 in response to a request from the client 104, in what may be referred to as a network DVR example. Like VOD, the recorded content 118($n$) may then be streamed to the client 104 when requested. Interaction with the content 118($n$) by the client 104 may be similar to interaction that may be performed when the content 122($c$) is stored locally in the storage device 120.

To collect revenue using a traditional advertising model, the content provider 108 may embed advertisements in the content 116($k$). Likewise, the network operator 102 may also embed advertisements 128($a$) obtained from the advertiser 106 in the content 118($n$) to also collect revenue using the traditional advertising model. For example, the content provider 108 may correspond to a "national" television broadcaster and therefore offer the content 116($k$) and national advertising opportunities to advertisers, which are then embedded in the content 116($k$). The network operator 102, on the other hand, may correspond to a "local" television broadcaster and offer the content 118($n$) with the advertisements embedded by the content provider 108 as well as advertisements obtained from local advertisers to the client 104.

Thus, the advertisements 130(d) which are included with the content 122(c) streamed to the client 104 may be provided from a variety of sources. Although national and local examples were described, a wide variety of other examples are also contemplated.

The manager module 126 is illustrated as including a behavior manager module 132 which is representative of functionality to promote content 118(n) that may include programs and/or advertisements 128(a)) to various behaviors of the clients 104. In an embodiment, the content 118(n) is promoted to behaviors of the clients 104 based upon behavior data that is anonymously communicated from the clients 104. For instance, behavior manager module 132 may receive behavior data having anonymous information that is matched to behaviors by clients 104. Then, behavior manager module 132 may be operable to promote content 118(n) to the behaviors by associating the received anonymous information with the content 118(n).

One way this may occur is by associating unique codes provided by the clients 104 who exhibit the behaviors with various content 118(n) to be promoted and/or recommendations for the content 118(n). A promotion having the associated unique codes may be output to the clients 104. A client 104 may then identify is own unique codes in the promotion to obtain the corresponding recommendations and/or content 118(n).

The client 104 is illustrated as having a behavior module 134 that is representative of functionality operable by the client 104 to communicate data related to behaviors of the client 104 to the network operator 102. Behavior module 134 may also be operable to obtain and process promotions output by the network operator. In at least some embodiments, the behavior related data may be configured as a data log that is kept by the client 104 to match behaviors of the client 104 to unique codes. For instance, behavior module 134 of a client 104 may operate to detect various behaviors. The behavior module 134 may match the one or more behavior with a unique code. Behavior module may also store a record of the unique code, and cause communication of behavior data including the matched behaviors/unique code to the network operator 102.

To maintain anonymity, a relationship between the client 104 and unique codes of the client 104 may be controlled by the client 104. Thus, a unique code matched to one or more behaviors by a client 104 is recognizable to the client 104. However, a unique code may be insufficient for the network operator 102 to identify a client 104 from which the unique code is received. In this way, client 104 may anonymously communicate its behaviors to the network operator 102, further discussion of which may be found in relation to the following figures.

Figure 2:
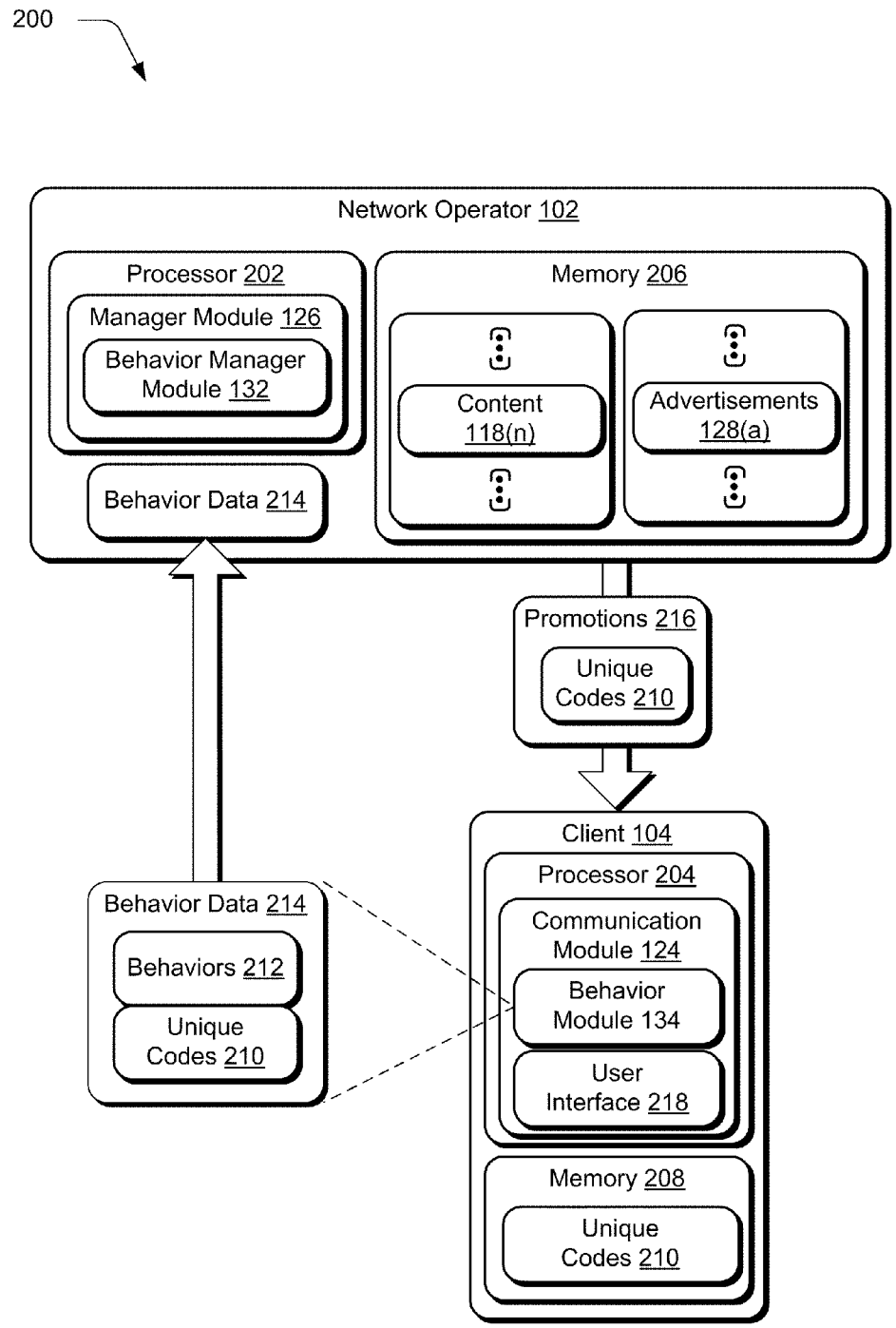
FIG. 2 is an illustration of a system showing a network operator and clients of FIG. 1 in greater detail.

FIG. 2 depicts a system 200 in an example implementation showing the network operator 102 of FIG. 1 and client 104 in greater detail. The client 104 may or may not correspond to the client 104 of FIG. 1. The network operator 102 and the client 104 are both illustrated as devices (e.g., the client 104 is illustrated as a client device) having respective processors 202, 204 and memory 206, 208. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 206, 208 is shown, respectively, for the network operator 102 and the clients 104, a wide variety of types and combinations of memory may be employed, such as random access memory (RAM), hard disk memory, removable medium memory, and other types of computer-readable media.

The client 104, for example, is illustrated as executing communication module 124 having the behavior module 134 on the processor 204, which is also storable in memory 208. As previously described, the behavior module 134 is representative of functionality operable by the client 104 to cause anonymous communication of data related to behaviors of the client 104 to the network operator 102. The client 104, by way of the behavior module 134, may form associations of unique codes 210 to behaviors 212, as illustrated in FIG. 2. The behavior module 134 may also store the unique codes 210 in memory 208. The associations of unique codes 210 and behaviors 212 may be communicated to network operator 104 as behavior data 214. The behavior data 214 communicated from the client may be configured such that it is insufficient to permit the network operator to identify the client 104.

The network operator 102, for example, is illustrated as executing the manager module 126 having the behavior manager module 132 on the processor 202, which is also storable in memory 206. Network operator may receive behavior data 214 from a plurality of clients 104 by way of the behavior manager module 132. From the perspective of the network operator 102, the behavior data 214 is a log of a plurality of behavior events associated to random information (e.g., unique codes 210 from clients 104).

As previously described, the behavior manager module 132 is representative of functionality to promote content to anonymous clients 104 based upon behaviors indicated by the clients 104. For example, behavior manager module 132 may use collected behavior data 214 to configure promotions 216 that may be output to clients 104. As illustrated in FIG. 2, promotions 216 may be configured to include unique codes 210 that are received from multiple clients 104 as behavior data 214. The unique codes 210 that are included in a promotion 216 may correspond to one or more clients 104 who have anonymously indicated one or more particular behaviors 212 by communicating behavior data 214 to the network operator. Moreover, the promotions 216 may recommend and/or include content 118(n) (e.g., programs and/or advertisements 128(a)) that is targeted to particular behaviors 212.

Thus, the promotions 216 may be configured to relate unique codes 210 corresponding to behaviors 212 of client 104 with content 118(n) targeted to the same behaviors 212. In other words, the promotions 216 are intended to promote content 118(n) that has been related in some way to behaviors 212 to those clients 104 who exhibit the behaviors 212. Using the unique codes 210 enables the anonymity of the clients 104 to be preserved. Because network operator 102 does not "know" relationships between the unique codes 210 and the clients 104, the network operator 102 does not "know" which particular clients 104 a promotion 216 is intended to reach. However, a client 104, by way of behavior module 134, may examine a promotion 216 to detect its own unique codes 210 that are included in the promotion 216 and may thereby determine that the promotion 216 is intended for the client 104. The client 104 may then be able to obtain the content 118(n) that is being promoted by the promotion 216.

In an embodiment, responsive to detecting its own unique codes 210 in a promotion 216, a client 104 may operate to output a user interface 218 that is configured to incorporate the promotion 216 that is obtained from the network operator 102. The user interface 218 may give recommendations for content 118(n) that is targeted to the client 104 based on behaviors 212 of the client 104. The user interface 218 may be configured to include various options selectable by a user to view the recommendations, navigate to obtain content 118

(*n*), output the content 118(*n*), and so forth. Further discussion of promotions 216 that may be output by a network operator 102 to clients 104 may be found in relation to the following procedures.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques of content promotion to anonymous clients are platform-independent, meaning that the techniques may be implemented on a variety of commercial computing platforms having a variety of processors.

Example Procedures

The following discussion describes techniques involving content promotion to anonymous clients that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
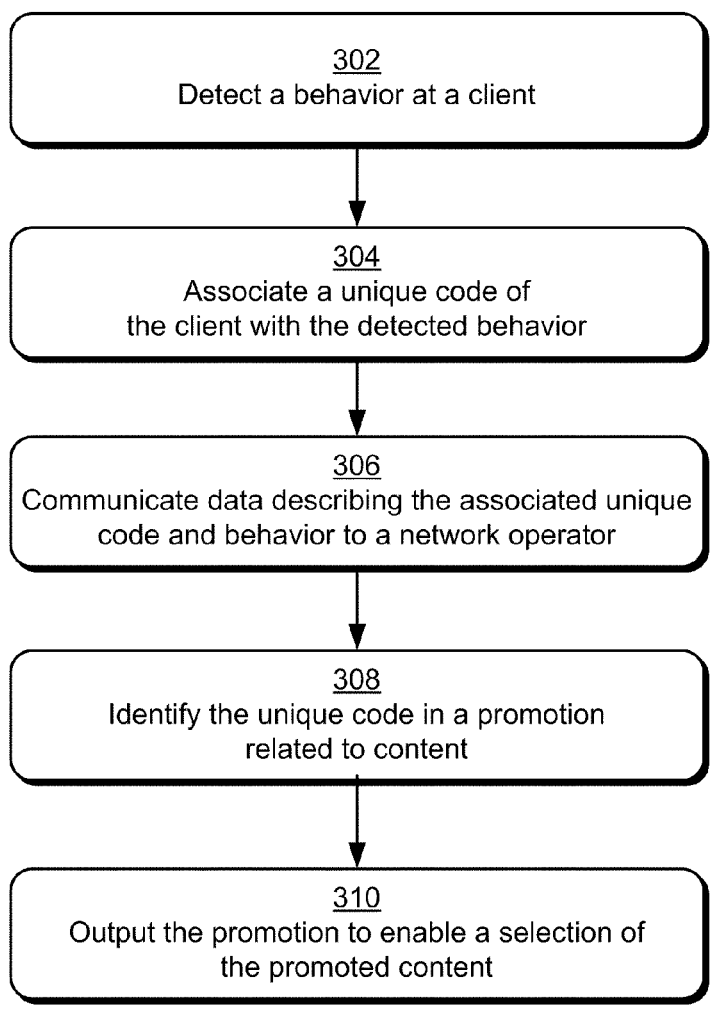
FIG. 3 is a flow diagram depicting a procedure in an example implementation in which a client anonymously associates behaviors with unique codes.

FIG. 3 depicts a procedure 300 in an example implementation in which a client anonymously associates behaviors with unique codes. Behaviors are detected at a client (block 302). For example, a behavior module 134 of a client 104 may be configured to detect targeted behaviors at the client 104. In an embodiment, the behavior module 134 may maintain or access a list of targeted behaviors that may be detected. In at least some embodiments a network operator 102 may communicate the list of targeted behaviors to multiple clients 104. Additionally or alternatively, the network operator 102 may maintain the list of targeted behaviors at a storage location accessible to the clients 104, such as being accessible over a suitable network connection 114.

The targeted behaviors may be designated by the network operator 102 to relate to various interaction of a client 104 with content 118(*n*). In an embodiment, the content 118(*n*) may be configured to include television programs and/or advertisements 128(*a*). By way of example and not limitation, behaviors related to interaction with content 118(*n*) may include: a selection of content 118(*n*); tuning to a channel; interaction with an electronic program guide (EPG); output of a particular television program; ordering a pay-per-view or video-on-demand event; displaying a designated advertisement or advertisement program; ordering a product or service through interactive functionality of the client 104; recording of a program through DVR functionality of the client 104; activating interactive functionality accessible through an electronic programming guide; and so forth. To detect these and other behaviors of a client 104, the behavior module 134 may monitor behaviors at the client 104 and reference the list of targeted behaviors to determine when targeted behaviors described by the list occur.

A unique code of the client is associated with the detected behavior (block 304). For example, responsive to detecting of a targeted behavior, behavior module 134 of a client 104 may be configured to generate a unique code 210 or other suitable anonymous information to associate with the behavior 212. In an embodiment, a unique code 210 associated with a behavior 212 may be configured as a randomly generated string composed of various alphanumeric characters. A client 104 may be configured to associate different anonymous information randomly with each detected behavior 212. Accordingly, a network operator that receives the information may be unable to correlate the information to the client 104.

The associated unique code and behavior is communicated to a network operator (block 306). For example, behavior module 134 of a client 104 may be configured to communicate behavior data 214 over network connection 114 to the network operator 102. As noted behavior data 214 may be arranged as one or more behaviors 212 that are matched to corresponding unique codes 210. In at least some embodiments, behavior module 134 may operate to create and store a log of behavior data 214 in memory 208 at a client 104. Behavior module 134 may then communicate the log of behavior data 214 to the network operator 102 at various times. Additionally or alternatively, behavior data 214 corresponding to each behavior 212 that is detected at the client 104 may be communicated as individual events to the network operator 102. In both case, behavior module 134 also stores unique codes 210 that have been associated with behaviors to 212 at the client 104, such as in memory 208.

By way of example, consider three clients 104, which for purposes of example may correspond to respective users named "Walter", "Veronica", and "Vivian". Each of the clients 104 may be configured with a behavior module 134 to monitor behaviors 212 at the client 104. The clients 104 may also include a communication module 124 to enable various interactions with content 118(*n*). The behavior module 134 may be configured to monitor behaviors related to the various interaction with content 118(*n*), which in this example include a "View Channel" behavior and a "Store Ad" behavior.

Now, assume "Walter" operates his client 104 to tune to a particular channel to watch a television program related to cooking. Behavior module 134 of "Walter's" client 104 may detect this as the "View Channel" behavior. In response, the behavior module 134 generates a unique code 210, such as "23423234", and associates the unique code 210 with the detected "View Channel" behavior. The behavior module 134 may also store "23423234" as a unique code 210 and communicate "View Channel, 23423234" as behavior data 214 to the network operator 102.

"Veronica" watches an advertisement related to women's clothing via her client 104 and selects an interactive option to store the advertisement. Behavior module 134 of "Veronica's" client 104 may detect this as the "Store Ad" behavior. In response, the behavior module 134 generates a unique code 210, such as "6346634", and associates the unique code 210 with the detected "Store Ad" behavior. The behavior module 134 may also store "6346634" as a unique code 210 and communicate "Store Ad, 6346634" as behavior data 214 to the network operator 102.

"Vivian" also operates her client 104 to tune to the television program related to cooking. Behavior module 134 of "Vivian's" client 104 may also detect this as the "View Channel" behavior. Accordingly, the behavior module 134 generates a unique code 210, such as "0986543", and associates the unique code 210 with the detected "View Channel" behavior. The behavior module 134 may also store "0986543" as a unique code 210 and communicate "View Channel, 0986543" as behavior data 214 to the network operator 102.

The network operator 102, by way of behavior manager module 132, receives behavior data 214 that includes "View Channel, 23423234", "Store Ad, 6346634" and "View Channel, 0986543". Network operator 102 does not "know" and is not able to determine from this behavior data 214 relationships to "Walter", "Veronica", and "Vivian" or their respective clients 104. To the network operator 102, the behavior data 214 is a set of random numbers (e.g., unique codes 210) associated with behaviors 212.

Assume now, that the network operator 102 identifies content 118(n) to promote to people who may be interested in cooking, such as a new cooking program. In this example, network operator 102 "knows" that the "View Channel" behavior also corresponds to a television program related to cooking. Accordingly, the network operator 102 may target the new cooking show to the "View Channel" behavior.

To do so, behavior manager module 132, may configure a promotion 216 for the new cooking show to include those unique codes 210 that are associated with the "View Channel" behavior. For instance, behavior manager module 132 may examine behavior data 214 for the "View Channel" behavior and extract the unique codes 210 that were provided by "Walter" and "Vivian", e.g., "23423234" and "0986543" respectively. The extracted unique codes 210 may then be included in the promotion 216. In an embodiment, the promotion 216 may be configured as a message that may be broadcast to multiple clients 104. By way of example and not limitation, a promotion 216 suitable to promote the new cooking show in this example may be configured as follows:

Broadcast Message
To: 23423234, 0986543
From: Network Operator
New Cooking Show—7:00 PM Tuesday—Channel 12

A variety of other examples of suitable promotions 216 are contemplated, further discussion of which may be found in relation to the following figures.

Identification is made of the unique code in a promotion related to content (block 308). For instance, network operator 102 may configure a promotion 216 by way of behavior manager module 132 to promote content 118(n). Continuing the foregoing example, the promotion 216 configured as a broadcast message may be communicated by the network operator 102 to multiple clients 104, including the respective clients 104 of "Walter", "Veronica", and "Vivian". In an embodiment, the message is broadcast to each client 104. Additionally, or alternatively, the network operator 102 may post the message at suitable network storage location (e.g., memory 206) where clients 104 may access, view, and/or interact with the message.

Thus, the respective clients 104 of "Walter", "Veronica", and "Vivian" may each obtain the promotion 216 in some manner. The behavior module 134 for each client 104 may be configured to examine the promotion 216 to detect whether unique codes 210 corresponding to the client 104 are included in the promotion 216. For instance, behavior module 134 may compare unique codes 210 that it stored in memory 208 of the client 104 with unique codes 210 included in the promotion 216.

When a matching code is found, the behavior module 134 determines that the promotion 216 is intended for the client 104 and may take a variety of responsive actions. For instance, the behavior module 134 may display the promotion 216, store the promotion 216 for future viewing, automatically download content 118(n) recommended by way of the promotion 216, and so forth.

When a matching code is not found, the behavior module 134 determines that the promotion 216 is not intended for the client 104. The behavior module 134 may accordingly discard, delete, or otherwise ignore the promotion 216.

In the case of "Walter" in the continuing example, behavior module 134 of his client 104 may identify the code "23423234" in the example promotion 216 above. Likewise, in the case of "Vivian", behavior module 134 of her client 104 may identify the code "09865434" in the promotion 216. Accordingly, clients 104 of both "Walter" and "Vivian" identify their respective unique codes 210 in the promotion 216 and understand that the promotion was intended for them.

In the case of "Veronica", behavior module 134 of her client 104 does not find a matching unique code 210 in the promotion 216. Accordingly, the client 104 corresponding to "Veronica" understands that the promotion was not intended for her and may discard, delete, or otherwise ignore the promotion 216.

As noted, a variety of actions are contemplated that may be performed in response to identification by a client 104 of a unique code 210 corresponding to the client 104 in a promotion 216. In one example, the promotion is output to enable a selection of the promoted content (block 310). In the case of "Walter" and "Vivian" above, their respective clients 104 may be configured to output the promotion 216 in response to identification of a unique code 210 corresponding to the client 104 in the promotion 216. For example, behavior module 134 may configure a user interface 218 to display the promotion 216. In the above example, the broadcast message recommending the new cooking show may be displayed in the user interface 218. Thus, the user interface 218 may display the promotion 216 as a recommendation for the promoted content 118(n). The user interface 218 may be also be configured to enable selection of the promoted content 118(n). For instance, the user interface 218 may include various selectable options to enable "Walter" and "Vivian" to select the promoted new cooking show, such as by programming their clients 104 to automatically tune to the new cooking show, download and store the new cooking show, set a reminder for the program, schedule recording, and so forth.

Figure 4:
FIG. 4 is an illustration of an example implementation of a content promotion that may be output to a client in accordance with one or more embodiments.

FIG. 4 illustrates an example implementation 400 of a user interface that may be displayed at a client 104 to output a promotion 216. For instance, a client 104 may display the user interface 218 responsive detecting its own unique codes 212 in a promotion 216 obtained from a network operator 102. A display device is shown as outputting the user interface 218 which includes language stating "Based upon your behaviors you may enjoy these selections". User interface 218 may be configured according to a promotion 216 with a variety of recommendations and/or selectable options regarding content 118(n) that is being promoted.

Recommendations and/or selectable options for content 118(n) in a user interface 218 may relate to television programs and/or advertisements 128(a). In the depicted example, the user is given a first selectable option 402 to view "Programs" and a second selectable option 404 to view "Advertising". Selection of the selectable options 402, 404 may cause display of additional information regarding "Programs" and "Advertising" respectively, such as recommendations for content 118(n) that meets the selected option. Further, multiple promotions 216 received from network operator 102 may be stored in memory 208 and may be accessible by users via the user interface 218. The selectable options 402, 404 may be also be configured as links selectable to cause provision of content 118(n) that meets the selected option from the network operator 102. A user interface 218 may also include various other selectable options, such as options to obtain, store, record, and/or output the promoted content 118(n) at the client 104. A variety of other examples of user interfaces 218 to output promotions 216 are also contemplated, such as display of ads or other content 118(n) directly via the user interface 218, providing a list of recommendations for content 118(n) based on multiple promotions 216, displaying links to recommended content 118(n), exposing options to save and/or download recommended content 118(n), and so on.

Figure 5:
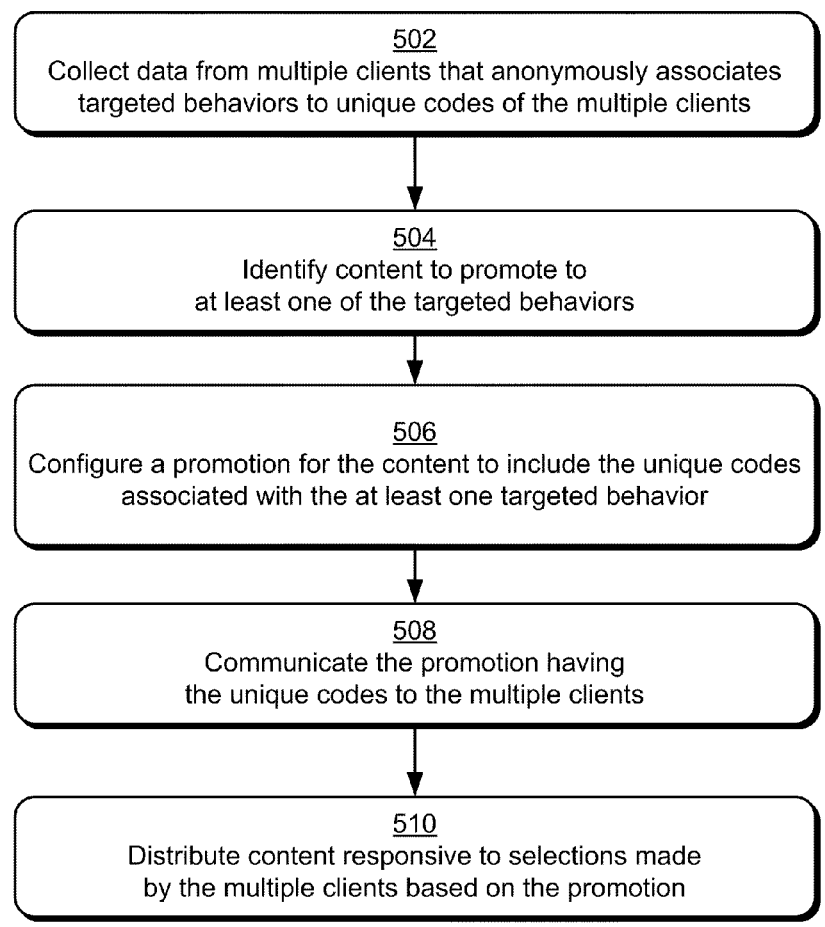
FIG. 5 is a flow diagram depicting a procedure in an example implementation in which a network operator promotes content to clients anonymously.

FIG. 5 depicts procedure 500 in an example implementation in which a network operator anonymously promotes content to clients. Data is collected from multiple clients that anonymously associates targeted behaviors to unique codes of the multiple clients (block 502). For example, behavior manager module 132 of a network operator 102 may collect a variety of data related to behaviors of clients 104 over the network connection 114. As noted previously, the network operator 102 may designate various targeted behaviors in a list that is provided to the clients 104. Clients 104 may monitor for the target behaviors and communicate behavior data 214 to the network operator 102 as described above. The behavior data 214 may match various behaviors to unique codes 210, or other suitable anonymous information, that are identifiable by the clients 104. Behavior data 214 obtained from multiple clients 104 may be stored at a network operator 102, such as in memory 206.

Identification is performed as to content to promote to at least one of the target behaviors (block 504). For, instance a behavior manager module 132 may provide functionality to designate content 118(n) to promote to particular behaviors 212. For example, in the case of the new cooking show discussed in relation to FIG. 3, data may be input via the behavior manager module 132 to relate the new cooking show to the "View Channel" behavior. A variety of other relations of content 118(n) to behaviors 212 may be input and stored, such as in memory 206 at the network operator 102. The behavior module 132 may reference the stored relations of content 118(n) to behaviors 212 to identify content 118(n) to promote to clients 104 that anonymously indicate corresponding behaviors 212.

In an embodiment, behavior manager module 132 may perform analysis on the behavior data 214 to assess when to promote content 118(n) to a behavior 212. Using example discussed above, the behavior data 214 indicates that twice as many users perform the "View Channel" behavior relative to the "Store Ad" behavior. Thus, a decision to promote the new cooking show may be based at least in part upon the number of clients 104 indicating "View Channel".

A promotion is configured for the content to include the unique codes associated with the a least one targeted behavior (block 506) and the promotion having the unique codes is communicated to the multiple clients (block 508). For instance, behavior manager module 132 may examine behavior data 214 to identify and/or extract unique codes 210 that are related to a particular behavior 212. These identified unique codes 210 may be included in a promotion of content 118(n) to those clients 104 that indicate the particular behavior. Because the network operator 102 may not "know" which clients 104 have associated unique codes 210 a particular behavior, the promotion 216 may be output to multiple clients including some who indicated the particular behavior and some who did not. In an embodiment, the promotion 216 may be broadcast to each client 104. Additionally, or alternatively, the network operator 102 may post the message at suitable network storage location (e.g., memory 206) where clients 104 may access, view, and/or interact with the message. For example, each client 104 may examine the promotion 216 to detect their respective unique codes 210 as previously described. In this way, the network operator 102 may use the unique codes 210 corresponding to a behavior 212 to promote identified content 118(n) to clients 104 exhibiting the behavior 212. The network operator may do so without being able to identify the clients 104 having the behavior 212.

Content is distributed responsive to selections made by the multiple clients based on the promotion (block 510). For example, when a client 104 detects its own unique code 210 in the promotion 216, the client 104 may output a user interface 218, such as in the example of FIG. 4 to display recommendations for content 118(n) that correspond to the promotion 216. The user interface 218 may also enable various selections of the promoted content 118(n). In an embodiment, selections of content 118(n) made via the user interface 218 may cause provision of the selected content 118(n) over the network connection 114 from the network operator 102. Selection of content 118 (n) may also relate to causing the client 104 to automatically tune to a broadcast of the content at a scheduled time and/or to set a recording of the content 118(n) to occur at the scheduled time.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a client device adapted to output television content comprising:
    detecting a behavior related to interaction with broadcast content at the client device;
    responsive to detecting the behavior, generating a unique code randomly for the detected behavior by the client device as anonymous information that is controlled by the client device, the unique code supplied for inclusion in promotions to enable recognition by the client device;
    preventing identification of the client device by associating the unique code anonymously with the detected behavior before communicating data that describes the association of the unique code and the behavior to a network operator;
    receiving a promotion at the client device that includes a plurality of unique codes associated with the behavior, is sent to multiple client devices including some client devices that have not detected the behavior, and describes promoted content that is targeted to the behavior; and
    identifying the unique code at the client device from the plurality of unique codes included in the promotion by comparing codes stored by the client device to the plurality of unique codes included in the promotion and matching one of the codes stored by the client device to the unique code.

2. A method implemented by the client device as described in claim 1, further comprising outputting a user interface to display the promotion responsive to identifying the unique code in the promotion.

3. A method implemented by the client device as described in claim 2, further comprising:
    receiving, via the user interface, a selection of the promoted content; and
    obtaining the promoted content from the network operator.

4. A method implemented by the client device as described in claim 1, wherein the promoted content is a television program.

5. A method implemented by the client device as described in claim 1, wherein the promoted content is an advertisement.

6. A method implemented by the client device as described in claim 1, including storing the promotion responsive to identifying the unique code in the promotion.

7. A method implemented by the client device as described in claim 1, wherein the behavior is viewing of an advertisement via the client device.

8. A method implemented by the client device as described in claim 1, wherein the behavior is tuning of the client device to a particular channel.

9. A method implemented by the client device as described in claim 1, wherein the behavior is scheduling to record a particular television program by the client device.

10. A method implemented by the client device as described in claim 1, further comprising:
    storing the unique code locally at the client device;
    receiving the promotion as a message broadcast by the network operator; and
    comparing the unique code stored locally at the client to the plurality of codes in the message to perform the identifying.

11. A method implemented by the client device as described in claim 1, wherein the data describing the association of the unique code and the behavior communicated by the client device to the network operator is not sufficient to identify the client device.

12. A method implemented by a network operator that provides streaming television content comprising:
    collecting, at the network operator, data from multiple clients that anonymously associates targeted behaviors to unique codes of the multiple clients, respectively, the anonymous association of the targeted behaviors to the unique codes effective to prevent the network operator from identifying the multiple clients from the data collected at the network operator, the unique codes generated randomly by the multiple clients as the targeted behaviors are detected such that each of the targeted behaviors corresponds to a plurality of the unique codes of the multiple clients and each client controls its own unique codes recognizable by the client and not recognizable by others in promotional messages communicated by the network operator;
    identifying television content to promote to at least one said targeted behavior; and
    promoting the identified television content to one or more of the multiple clients using the unique codes from the collected data that correspond to the at least one said targeted behavior without knowing which of the multiple clients exhibited the targeted behavior.

13. A method implemented by the network operator as described in claim 12, wherein the promoting comprises:
    configuring a message to promote the identified television content to include the unique codes that correspond to the at least one said targeted behavior; and
    communicating the message to promote the identified television content to the multiple clients.

14. A method implemented by the network operator as described in claim 12, further comprising:
    defining a list of the targeted behaviors; and
    communicating the list of the targeted behaviors to the multiple clients to cause monitoring of the targeted behaviors by the multiple clients.

15. A method implemented by the network operator as described in claim 14, wherein the targeted behaviors relate to interaction of the multiple clients with content broadcast to the multiple clients by a network operator.

16. A client device comprising one or more modules and hardware configured to perform operations specified by the one or more modules including:
    storing a unique code associated with a behavior, the unique code generated by the client after detection of the behavior and as anonymous information controlled by the client that is recognizable only by the client to identify recommendations intended for the client;
    enabling network operators to deliver recommendations to the client device, the enabling maintaining anonymity of the client device by communicating data describing an anonymous association of the unique code with the behavior to a network operator; and
    receiving a recommendation at the client device for broadcast content targeted to the behavior from the network operator, wherein the broadcast content is targeted to multiple clients having the behavior using the unique code and at least one different unique code that corresponds to a different client and is not associated by the client with the behavior, the unique code and the at least one different unique code both included with the recommendation received at the client device;
    examining the recommendation to detect whether the recommendation includes the unique code; and
    outputting a user interface configured to display the recommendation for the broadcast content based on inclusion of the unique code in the recommendation.

17. A client device as described in claim 16, wherein the operations specified by the one or more modules further include:
    detecting the behavior at the client device; and
    associating the unique code anonymously with the behavior.

18. A client device as described in claim 16, wherein:
    the recommendation for the broadcast content includes a recommended television program and a recommended advertisement; and
    the user interface includes:
        a user-selectable option regarding the recommended television program; and
        another user-selectable option regarding the recommended advertisement.

19. A client device as described in claim 18, wherein the user-selectable option and the other user-selectable option are selectable respectively to cause provision of the recommended television program and the recommended advertisement to the client by the network operator.

20. A client device as described in claim 18, wherein the user-selectable option regarding the recommended television program is selectable to set the client device to record the recommended television program at a scheduled time.

* * * * *